United States Patent
Fuse

(10) Patent No.: US 8,253,900 B2
(45) Date of Patent: Aug. 28, 2012

(54) IMAGE DISPLAY APPARATUS AND VIEWING ANGLE COMPENSATION METHOD

(75) Inventor: Makoto Fuse, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 392 days.

(21) Appl. No.: 12/730,723

(22) Filed: Mar. 24, 2010

(65) Prior Publication Data
US 2010/0245742 A1 Sep. 30, 2010

(30) Foreign Application Priority Data
Mar. 25, 2009 (JP) ................... 2009-075193

(51) Int. Cl.
G02B 21/00 (2006.01)
G02B 21/18 (2006.01)
G02F 1/1335 (2006.01)
(52) U.S. Cl. ......................... 349/117; 353/53
(58) Field of Classification Search ............ 349/117, 349/118, 119, 120, 130, 141; 353/20, 31, 353/53
See application file for complete search history.

(56) References Cited

U.S. PATENT DOCUMENTS

| | | | | |
|---|---|---|---|---|
| 5,895,106 A | * | 4/1999 | VanderPloeg et al. | 349/120 |
| 5,907,378 A | * | 5/1999 | Abileah et al. | 349/123 |
| 5,990,997 A | * | 11/1999 | Jones et al. | 349/120 |
| 7,002,641 B2 | * | 2/2006 | Okuyama et al. | 349/9 |
| 7,661,823 B2 | | 2/2010 | Terada et al. | |
| 7,956,965 B2 | * | 6/2011 | Jeon et al. | 349/119 |
| 8,049,850 B2 | * | 11/2011 | Sugiyama et al. | 349/118 |

FOREIGN PATENT DOCUMENTS
JP A-2006-259256 9/2006
* cited by examiner

Primary Examiner — Akm Enayet Ullah
(74) Attorney, Agent, or Firm — Oliff & Berridge, PLC

(57) ABSTRACT

An image display apparatus includes: a light source; a light modulator that modulates the light flux emitted from the light source, the light modulator including a liquid crystal panel in which liquid crystal molecules are sealed, the liquid crystal panel having a modulation area where an incident light flux is modulated, and a pair of polarizing elements disposed on opposite sides of the liquid crystal panel, on the light flux incident side and the light flux exiting side thereof; and a compensating element disposed between at least one of the pair of polarizing elements and the modulation area, the compensating element compensating an optical phase difference resulting from birefringence associated with the liquid crystal molecules, wherein the compensating element is sized to be smaller than the modulation area and disposed based on the viewing angle characteristics of the modulation area.

5 Claims, 4 Drawing Sheets

IMAGE DISPLAY APPARATUS AND VIEWING ANGLE COMPENSATION METHOD

BACKGROUND

1. Technical Field

The present invention relates to an image display apparatus and a viewing angle compensation method for compensating an optical phase difference resulting from birefringence associated with liquid crystal molecules that form a liquid crystal panel used in the image display apparatus.

2. Related Art

There has been a known projector including a light source, a light modulator that modulates the light flux emitted from the light source in accordance with image information, and a projection optical unit that enlarges and projects the modulated light flux on a screen or any other suitable projection surface. A known example of the light modulator is a liquid crystal light valve including a liquid crystal panel and a pair of polarizing elements that sandwich the liquid crystal panel, the liquid crystal panel including a liquid crystal layer having liquid crystal molecules sealed between a pair of substrates and modulating a light flux incident thereon.

In a TN (Twisted Nemetic) liquid crystal light valve, the liquid crystal molecules are twisted between the substrates that sandwich the liquid crystal layer when no voltage is applied to the liquid crystal layer. In this case, the polarization direction of linearly polarized light having passed through the light flux incident-side polarizing element is rotated in accordance with the twisted arrangement of the liquid crystal molecules. The linearly polarized light whose polarization direction has been rotated passes through the light flux exiting-side polarizing element, which along with the light flux incident-side polarizing element forms a crossed-Nicol arrangement in a typically used normally white (NW) liquid crystal light valve, resulting in a bright state.

On the other hand, when a sufficient voltage is applied to the liquid crystal layer, the orientation of the liquid crystal molecules becomes perpendicular to the substrates that sandwich the liquid crystal layer, and the polarization direction of the linearly polarized light having passed through the light flux incident-side polarizing element is not rotated. As a result, in the NW liquid crystal light valve, the linearly polarized light is blocked by the light flux exiting-side polarizing element, resulting in a dark state. On the other hand, in a normally black (NB) scheme, since the directions of the transmission axes of a pair of polarizing elements are parallel to each other, the bright and dark states are reversed.

When light is incident on a NW liquid crystal light valve, which is configured as described above, obliquely with respect to a normal to the light flux incident-side substrate of the pair of substrates that sandwich the liquid crystal layer, birefringence associated with the liquid crystal molecules in the vicinity of that substrate disadvantageously cause part of the light to pass through the light flux exiting-side polarizing element (leakage of light from the liquid crystal light valve). As a result, the contrast of an image to be formed disadvantageously decreases.

To address the problem, there has been a known solution in which a compensating element that cancels the effect of birefringence associated with the liquid crystal molecules and compensates the optical phase difference resulting from the birefringence (see JP-A-2006-259256, for example). In the projector described in JP-A-2006-259256, the viewing angle characteristics of a liquid crystal light valve are improved by providing the compensating element (viewing angle compensator) between a liquid crystal panel and a light exiting-side polarizer. That is, the optical phase difference resulting from the birefringence associated with the liquid crystal molecules, the effect of the birefringence, is cancelled by providing an antiphase compensating element.

It is noted that the orientation (arrangement) of the liquid crystal molecules located in the vicinity of the substrates that sandwich the liquid crystal layer is not uniform when a voltage is applied, in other words, the viewing angle characteristics of the liquid crystal panel are not uniform as a whole. As a result, the method used in the projector described in JP-A-2006-259256, in which a single compensating element that covers the liquid crystal layer and has a compensation direction aligned with a predetermined direction is used to improve the viewing angle characteristics of the entire liquid crystal panel, does not work, resulting in a portion where the viewing angle is compensated and a portion where the viewing angle is not compensated. As a result, a NW liquid crystal light valve suffers from black unevenness or in-plane contrast unevenness in the dark state. In particular, when an inexpensive liquid crystal panel including no lens array in which tiny lenses that guide the light to be incident on black matrices to the liquid crystal layer are arranged in correspondence with pixels is used, black unevenness more likely occurs than in a case where a liquid crystal panel including the lens array.

SUMMARY

An advantage of some aspects of the invention is to provide an image display apparatus and a viewing angle compensation method capable of improving the viewing angle characteristics in a satisfactory manner.

An image display apparatus according to a first aspect of the invention includes a light source and a light modulator that modulates the light flux emitted from the light source. The light modulator includes a liquid crystal panel in which liquid crystal molecules are sealed, the liquid crystal panel having a modulation area where an incident light flux is modulated, and a pair of polarizing elements disposed on opposite sides of the liquid crystal panel, on the light flux incident side and the light flux exiting side thereof. The image display apparatus further includes a compensating element disposed between at least one of the pair of polarizing elements and the modulation area, the compensating element compensating an optical phase difference resulting from birefringence associated with the liquid crystal molecules. The compensating element is sized to be smaller than the modulation area and disposed based on the viewing angle characteristics of the modulation area.

An example of the compensating element can be a film including orientation films provided on respective support members made of, for example, TAC (triacetyl cellulose) and discotic compound molecules, which are negative uniaxial compound (discotic liquid crystal compound, for example) molecules or liquid crystal polymer molecules, the discotic compound or liquid crystal polymer molecules arranged in such a way that the orientation angle thereof continuously changes along the thickness direction of the film.

According to the first aspect of the invention described above, since the compensation element sized to smaller than the modulation area is disposed between the modulation area and at least one of the pair of polarizing elements based on the viewing angle characteristics of the modulation area of the liquid crystal panel, the viewing angle characteristics of the modulation area can be partially improved. For example, when the compensating element is disposed at two locations in the modulation area and the compensation directions of the compensating elements are set in accordance with the viewing angle characteristics at the respective locations in the modulation area, the viewing angle characteristics at the locations can be improved independently. It is therefore possible to improve the viewing angle characteristics of the modulation area more preferably than in the projector described in JP-A-2006-259256. It is therefore also possible to suppress unevenness in in-plane contrast of the light modulator set to have the dark state when the liquid crystal panel operates in a NW scheme.

It is preferred that the modulation area has a substantially rectangular shape when viewed in the direction in which the light flux incident on the modulation area travels, and that the compensating element is disposed at least one of the four corners of the modulation area.

According to the preferred embodiment of the invention described above, the viewing angle characteristics at the corner of the modulation area where the compensation element is disposed can be improved. It is noted in the modulation area having a substantially rectangular shape when viewed from the light flux incident side or the light flux exiting side that the viewing angle characteristics at the center of the modulation area differ from those at a corner thereof. In view of this fact, the viewing angle characteristics of the entire modulation area can be appropriately improved by providing a plurality of compensating elements at the four corners of the modulation area, whereby the viewing angle characteristics of the modulation area can be more preferably improved.

It is preferred that the compensating element is disposed at the two corners on at least one of the pair of diagonal lines of the modulation area, and that the image display apparatus further includes a light-transmissive substrate that holds the compensating elements in such a way that the compensation directions thereof substantially coincide with each other.

The viewing angle characteristics at the two corners on one of the pair of diagonal lines of the substantially rectangular modulation area substantially coincide with each other. In view of this fact, in the aspect or embodiments of the invention, the two compensating elements provided at the respective two corners located on a diagonal line of the modulation area are held on the light-transmissive substrate in such a way that the compensation directions of the compensating elements substantially coincide with each other. Making use of this configuration, one can adjust the compensation directions of the compensating elements all together in accordance with the viewing angle characteristics of the corresponding locations (such as the direction in which the liquid crystal molecules are oriented at the locations) only by adjusting the position of the light-transmissive substrate. The compensation elements can therefore be readily positioned.

It is preferred that the compensating element is disposed between the modulation area and the polarizing element located at the light flux exiting side of the modulation area.

In some cases, the lens array described above, in which tiny lenses are arranged in a matrix in correspondence with pixels, is disposed on the light flux incident side of the modulation area. Each of the lenses guides the light to be incident on the black matrices in the liquid crystal panel to the liquid crystal layer to improve light usage efficiency. When such a lens array is provided, disposing the compensating element described above on the light flux exiting side of the modulation area allows the viewing angle characteristics of the modulation area to be reliably improved even when the path of the light is deflected by the lens array. As a result, the viewing angle characteristics of the modulation area can be reliably improved irrespective of whether or not the lens array is present.

As described above, an inexpensive liquid crystal panel with no lens array tends to suffer from unevenness in in-plane contrast (black unevenness), as compared with an expensive liquid crystal panel with such a lens array. In contrast, using the viewing angle compensator allows the unevenness in in-plane contrast to be suppressed even when the inexpensive liquid crystal panel is employed and the manufacturing cost of the image display apparatus to be reduced.

A viewing angle compensation method of a second aspect of the invention compensates an optical phase difference resulting from birefringence associated with liquid crystal molecules sealed in a liquid crystal panel having a modulation area where an incident light flux is modulated. The method includes disposing a compensating element that is sized to be smaller than the modulation area and compensates the optical phase difference resulting from the birefringence associated with the liquid crystal molecules on at least one of the light flux incident side and the light flux exiting side of the modulation area based on the viewing angle characteristics of the modulation area, and adjusting the compensation direction of the compensating element based on the viewing angle characteristics of the modulation area.

Since the second aspect of the invention described above can provide the same advantageous effect as that provided in the image display apparatus described above, the viewing angle characteristics of the liquid crystal panel can be preferably improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
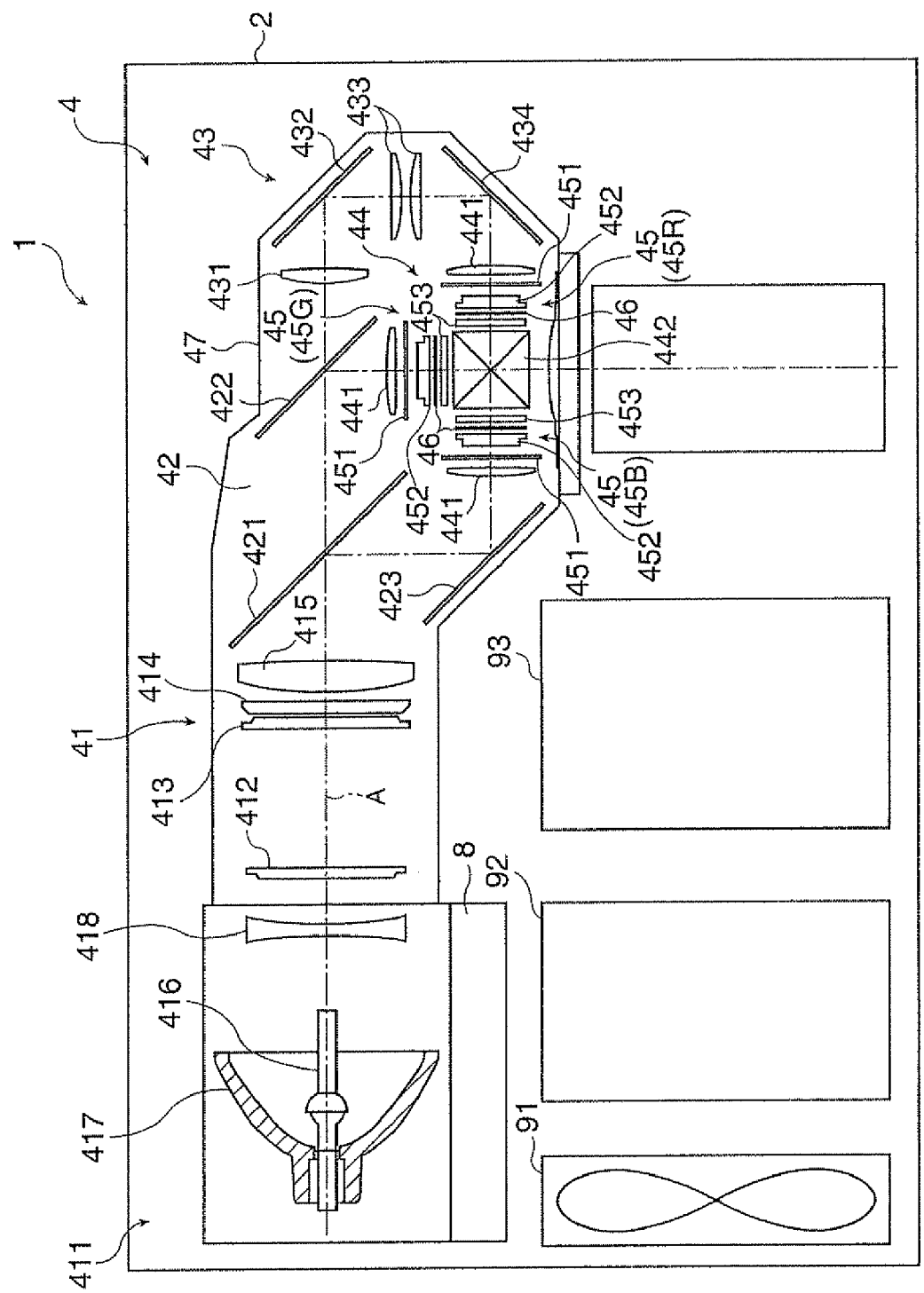
FIG. 1 is a diagrammatic view showing a schematic configuration of a projector according to an embodiment of the invention.

An embodiment of the invention will be described below with reference to the drawings. Schematic configuration of projector FIG. 1 is a diagrammatic view showing a schematic configuration of a projector 1 according to the present embodiment.

The projector 1 according to the present embodiment is an image display apparatus that modulates the light flux outputted from a light source section 411 provided in the projector 1 in accordance with image information to form image light and enlarges and projects the image light on a screen or any other suitable projection surface (not shown). The projector 1 includes an exterior housing 2, a projection optical unit 3, and an optical unit 4, as shown in FIG. 1.

In addition to the components described above, the projector 1 further includes a cooling unit 91 formed of a cooling fan and other components that cool the interior of the projector 1, a power source unit 92 that supplies electric power to the components in the projector 1, and a control unit 93 that controls the entire projector 1. The cooling unit 91, the power source unit 92, and the control unit 93 are disposed outside the exterior housing 2.

Configuration of Exterior Housing and Projection Optical Unit

The exterior housing 2 houses and arranges the projection optical unit 3, the optical unit 4, and other components and has a substantially box-like shape as a whole.

The projection optical unit 3 not only focuses the image light formed by the optical unit 4 on the screen or any other suitable projection surface (not shown) but also enlarges and projects an image according to the image light. The projection optical unit 3 is formed of a combination of a plurality of lenses housed in a tubular lens barrel.

Configuration of Optical Unit

The optical unit 4 forms image light according to image information under the control of the control unit 93 described above. The optical unit 4 has a substantially L-like shape when viewed from the above extending along not only the rear surface of the exterior housing 2 but also a side surface thereof.

The optical unit 4 includes an illumination optical system 41, a color separation optical system 42, a relay optical system 43, an electro-optical system 44, and an optical part housing 47 that not only houses and arranges the systems 41 to 44 along an illumination optical axis A set in the optical unit 4 but also supports and secures the projection optical unit 3 in a predetermined position.

The illumination optical system 41 provides substantially uniform illumination for a modulation area MA of each liquid crystal panel 452, which will be described later. The illumination optical system 41 includes the light source section 411, a pair of lens arrays 412, 413, a polarization conversion element 414, and a superimposing lens 415.

The light source section 411 includes a light source 416 that emits light, a reflector 417 that reflects the light emitted from the light source 416 and focuses the reflected light into a predetermined position, and a parallelizing lens 418 that makes the converging light flux reflected off the reflector 417 parallel to the illumination optical axis A described above. A high-pressure mercury lamp or any other suitable light source lamp is used as the light source 416 in the present embodiment, but an LED (Light Emitting Diode) or any other suitable solid light source can be employed. The reflector 417 can be formed of an elliptical reflector having an ellipsoidal surface, a parabolic reflector having a paraboloidal surface, or a free-form surface reflector. In the latter case, the parallelizing lens 418 can be omitted.

Each of the pair of lens arrays 412 and 413 has a configuration in which a plurality of lenslets are arranged in a matrix in a plane perpendicular to the central axis of the light flux incident from the light source section 411, and divides the incident light flux into a plurality of sub-light fluxes.

The polarization conversion element 414 converts the light having passed through the lens array 413 into one type of linearly polarized light.

The superimposing lens 415 along with the lens array 413 superimposes the sub-light fluxes incident through the lens array 413 and the polarization conversion element 414 on the modulation area MA of each liquid crystal panel 452.

The color separation optical system 42 includes a dichroic mirror 421 that reflects blue light, separates it from the light flux incident through the illumination optical system 41, and transmits green and red light, a dichroic mirror 422 that reflects the green light and transmits the red light, and a reflection mirror 423 that reflects the reflected blue light toward a field lens 441 for blue light, which will be described later.

The relay optical system 43 includes a light incident-side lens 431, relay lenses 433, and reflection mirrors 432, 434, and directs the red light separated by the color separation optical system 42 to a field lens 441 for red light. In the present embodiment, the relay optical system 43 is configured to guide red light but is not necessarily configured this way. For example, the relay optical system 43 may guide blue light.

The electro-optical system 44 includes the field lenses 441 provided for the respective separated red light, green light, and blue light, light modulators 45, and viewing angle compensators 46, as well as a single cross dichroic prism 442 as a light combining optical system.

Among the components described above, the three field lenses 441 provided for the respective color light beams convert the incident light fluxes into light fluxes parallel to the illumination optical axis A.

Each of the light modulators 45 (the light modulators for red light, green light, and blue light are called 45R, 45G, and 45B, respectively) includes a light incident-side polarizer 451, the liquid crystal panel 452, and a light exiting-side polarizer 453 disposed in this order in the direction in which the light flux incident through the corresponding field lens 441 travels.

The light incident-side polarizer 451 transmits only the light polarized in the polarization direction of the light polarized by the polarization conversion element 414 and absorbs the other light components. The light incident-side polarizer 451 and the light exiting-side polarizer 453 correspond to a pair of polarizing elements of an aspect of the invention.

The liquid crystal panel 452 operates in accordance with a drive signal, which represents image information, inputted from the control unit 93 described above, modulates the light flux incident through the light incident-side polarizer 451, and outputs the modulated light flux to the light exiting-side polarizer 453. The configuration of the liquid crystal panel 452 will be described later in detail.

The light exiting-side polarizer 453 transmits only the light polarized in the direction perpendicular to the optical transmission axis of the light incident-side polarizer 451 and absorbs the other light components. That is, the light incident-side polarizer 451 and the light exiting-side polarizer 453 form a crossed-Nicol arrangement. Each of the light modulators 45 in the present embodiment is therefore configured as a normally white (NW) liquid crystal light valve.

Each of the viewing angle compensators 46 is provided between the corresponding liquid crystal panel 452 and light exiting-side polarizer 453. When a light flux is incident obliquely on the modulation area MA of the liquid crystal panel 452 (when the incident light flux is inclined to a normal to a light flux incident plane of the liquid crystal panel 452), the viewing angle compensator 46 compensates the optical phase difference between the ordinary ray and the extraordinary ray resulting from the birefringence associated with the liquid crystal molecules. The configuration of the viewing angle compensator 46 will be described later in detail.

The cross dichroic prism 442 is a light combining optical system that combines the modulated color light beams to form full-color image light. The cross dichroic prism 442 is formed by bonding four rectangular prisms and thus has a substantially cubic shape and three light-incident surfaces on which the light fluxes having passed through the respective light exiting-side polarizer 453 are incident and one light-exiting surface. Two dielectric multilayer films are formed on the interfaces between the bonded rectangular prisms. The dielectric multilayer films transmit the incident green light and reflect the incident blue and red light in the direction in which the transmitted green light travels. The color light beams are thus combined to form full-color image light. The image light exits through the light-exiting surface toward the projection optical unit 3, which enlarges and projects the image light on the projection surface.

Configuration of Liquid Crystal Panel

Figure 2:
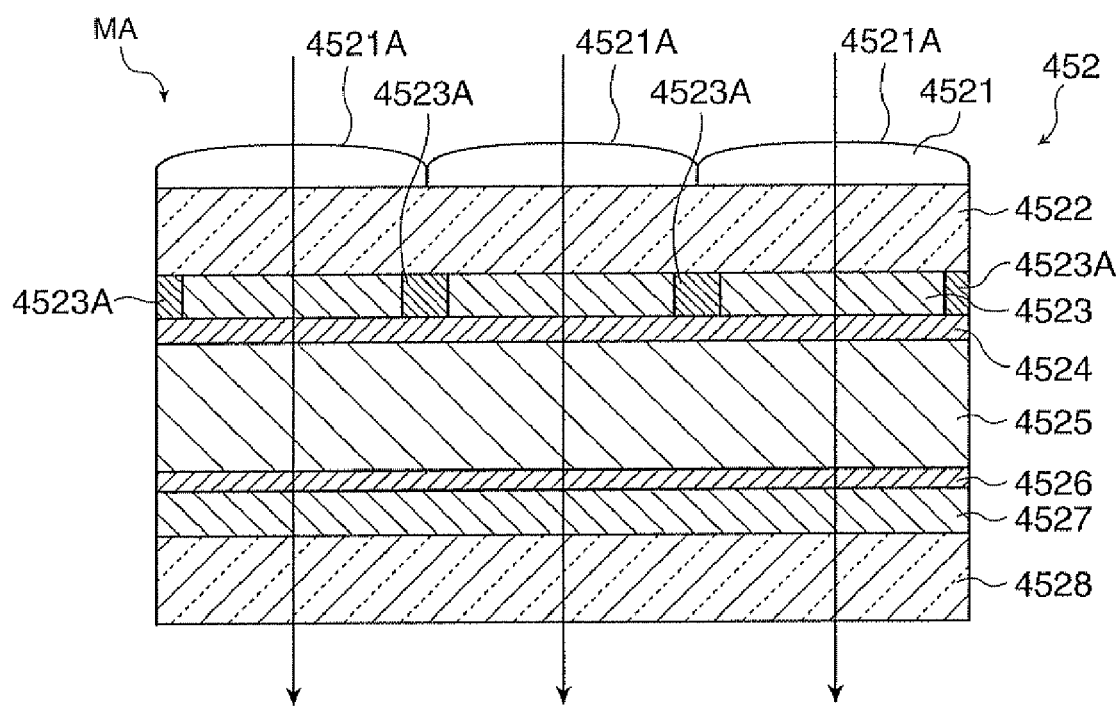
FIG. 2 is a cross-sectional view showing a schematic configuration of a liquid crystal panel in the embodiment.

FIG. 2 is a cross-sectional view diagrammatically showing a schematic configuration of each of the liquid crystal panels 452. FIG. 2 shows an area of the liquid crystal panel 452 (area corresponding to three pixels).

The liquid crystal panel 452 is formed of a TN (Twisted Nematic) liquid crystal panel and is driven in an active matrix scheme. The liquid crystal panel 452 includes a lens array 4521, a light-transmissive substrate 4522, a light-transmissive electrode film 4523, an orientation film 4524, a liquid crystal layer 4525, an orientation film 4526, a light-transmissive electrode film 4527, and a light-transmissive substrate 4528 disposed in this order in the direction in which an incident light flux travels, as shown in FIG. 2.

The lens array 4521 is formed of a plurality of tiny lenslets 4521A arranged in a matrix in correspondence with the pixels in the plane perpendicular to the central axis of the light flux incident on the liquid crystal panel 452. Each of the lenslets 4521A collects the incident light and guides the collected light to the liquid crystal layer 4525 at the corresponding pixel. The amount of light incident on black matrices 4523A in the light-transmissive electrode film 4523, which will be described later, is thus reduced, whereby the light is very efficiently used to form image light.

The pair of light-transmissive substrates 4522 and 4528 is made of glass or any other suitable material.

The pair of light-transmissive electrode films 4523 and 4527 is made of, for example, ITO (Indium Tin Oxide) or IZO (Indium Zinc Oxide: registered mark) and formed on the opposing sides of the pair of light-transmissive substrates 4522 and 4528. One of the light-transmissive electrode films on the light flux incident side, the light-transmissive electrode film 4523, forms a pixel electrode, and the other light-transmissive electrode film on the light flux exiting side, the light-transmissive electrode film 4527, forms a common electrode. The light-transmissive electrode film 4523 is provided with, although not shown, not only scan lines and signal lines formed in a grid pattern and TFTs (Thin Film Transistors), which are switching devices, connected thereto but also a plurality of black matrices 4523A that block light incident on the scan lines, the signal lines, and the TFTs.

The pair of orientation films 4524 and 4526 are formed on the opposing sides of the pair of light-transmissive electrode films 4523 and 4527. The pair of orientation films 4524 and 4526 are processed (rubbing process, for example) so that they orient the liquid crystal molecules, which are sealed therebetween and form the liquid crystal layer 4525, in a fixed direction.

The direction in which the orientation film 4524 orients the liquid crystal molecules (the direction of the rubbing process, for example) is perpendicular to the direction in which the orientation film 4526 orients the liquid crystal molecules. As a result, when no voltage is applied to the liquid crystal panel 452, the major axis direction of the liquid crystal molecules, which form the liquid crystal layer 4525, is parallel to the orientation films 4524 and 4526 and continuously twisted across the thickness of the liquid crystal layer 4525 in such a way that the major axis direction at one of the orientation films is twisted by 90 degrees at the other orientation film.

In the thus configured liquid crystal panel 452, the orientation of the liquid crystal molecules, which form the liquid crystal layer 4525, is controlled on a pixel basis in accordance with the voltage applied by the control unit 93 to the pair of light-transmissive electrode films 4523 and 4527, whereby the light flux incident through the light incident-side polarizer 451 is modulated to form image light, as described above. The area of the liquid crystal layer 4525 on which the light flux is incident therefore forms the modulation area MA, which has a substantially rectangular shape having an aspect ratio of 16:9 when viewed from the light-incident side.

Configuration of Viewing Angle Compensator

Figure 3:
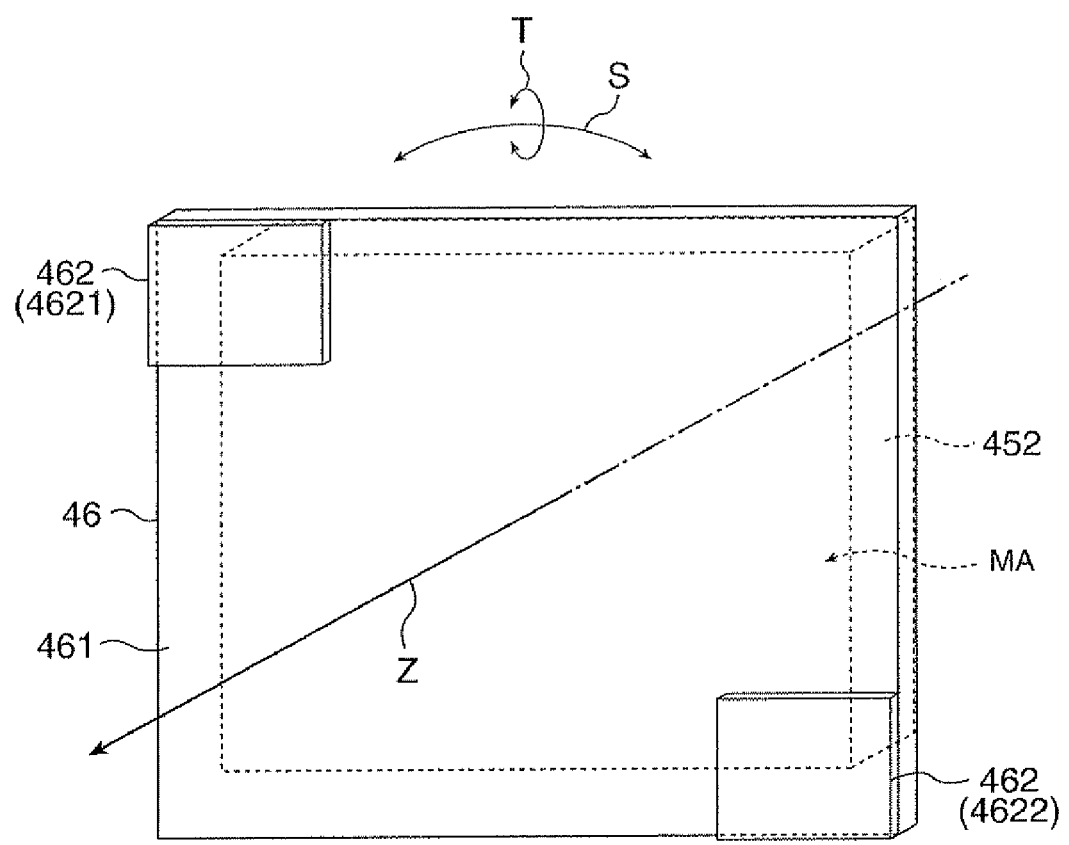
FIG. 3 is a schematic perspective view showing the configuration of a viewing angle compensator in the embodiment.

FIG. 3 is a schematic perspective view showing one of the viewing angle compensators 46.

The viewing angle compensator 46 compensates the optical phase difference resulting from the birefringence associated with the liquid crystal molecules when a light flux is incident obliquely on the modulation area MA, as described above. The viewing angle compensator 46 includes a light-transmissive substrate 461 and compensating elements 462 (4621 and 4622) attached thereto, as shown in FIG. 3.

The light-transmissive substrate 461 is formed of an optical glass member sized to be larger than the modulation area MA and disposed to cover the modulation area MA. The light-transmissive substrate 461 is gripped by an adjustment mechanism (not shown) when the positions of the compensating elements 462 are adjusted, and the light-transmissive substrate 461 is secured to a securing member (not shown) after the positioning of the compensating elements 462.

Each of the compensating elements 462 (4621 and 4622) is sized to be smaller than the modulation area MA (approximately 1/12 the area of the modulation area MA, for example). Each of the compensating elements 462, although not illustrated in detail, is formed of a film including orientation films formed on respective support members made of, for example, TAC (triacetyl cellulose) and discotic compound molecules, which are negative uniaxial compound (discotic liquid crystal compound, for example) molecules or liquid crystal polymer molecules, the discotic compound or liquid crystal polymer molecules arranged in such a way that the orientation angle thereof continuously changes along the thickness direction of the film.

In each of the viewing angle compensators 46, the thus configured compensating elements 4621 and 4622 are positioned on the light-transmissive substrate 461 at the two corners on one diagonal line among the four corners of the modulation area MA. The two compensating elements 4621 and 4622 are attached onto the light-transmissive substrate 461 in such a way that the compensation directions thereof coincide with each other.

In the modulation area MA of each of the liquid crystal panels 452, the viewing angle characteristics vary from location to location. For example, the viewing angle characteristics at the center of the modulation area MA differ from those at a corner thereof. In view of this fact, the compensating direction of each of the compensating elements, along which the optical phase difference resulting from the birefringence associated with the liquid crystal molecules is compensated, is also changed in accordance with the corresponding location on the modulation area MA.

On the other hand, since the two corners on each of the pair of diagonal lines of the modulation area MA have substantially the same viewing angle characteristics, the compensation directions at the two corners are set to be substantially the same.

To compensate the viewing angle associated with the liquid crystal panel 452, the compensating elements 4621 and 4622 described above are first positioned on the light-transmissive substrate 461 at the two corners on one of the diagonal lines of the modulation area MA in such a way that the compensation directions of the compensating elements coincide with each other, and the light-transmissive substrate 461 is disposed between the corresponding liquid crystal panel 452 and light exiting-side polarizer 453 (corresponding to the disposing step of an aspect of the invention).

An adjustment mechanism (not shown) is then used to pivot the light-transmissive substrate 461 not only in an S direction around the central axis (straight line Z in FIG. 3) of the incident light flux having passed through the liquid crystal panel 452 but also in a T direction around the direction perpendicular to the central axis based on the viewing angle characteristics (the direction in which the liquid crystal molecules are oriented, for example) at the two corners corresponding to the locations on the modulation area MA where the compensating elements 4621 and 4622 are disposed (corresponding to the adjusting step of an aspect of the invention). Specifically, the adjustment mechanism is used to adjust the position of the light-transmissive substrate 461, that is, the positions of the compensating elements 4621 and 4622, while the image light formed by the corresponding light modulator 45 set to have the dark state is observed.

The positioned light-transmissive substrate 461 is then secured, for example, to the prism 442 by using the securing member (not shown).

The viewing angle characteristics at the two corners of the modulation area MA are thus improved.

Figure 4:
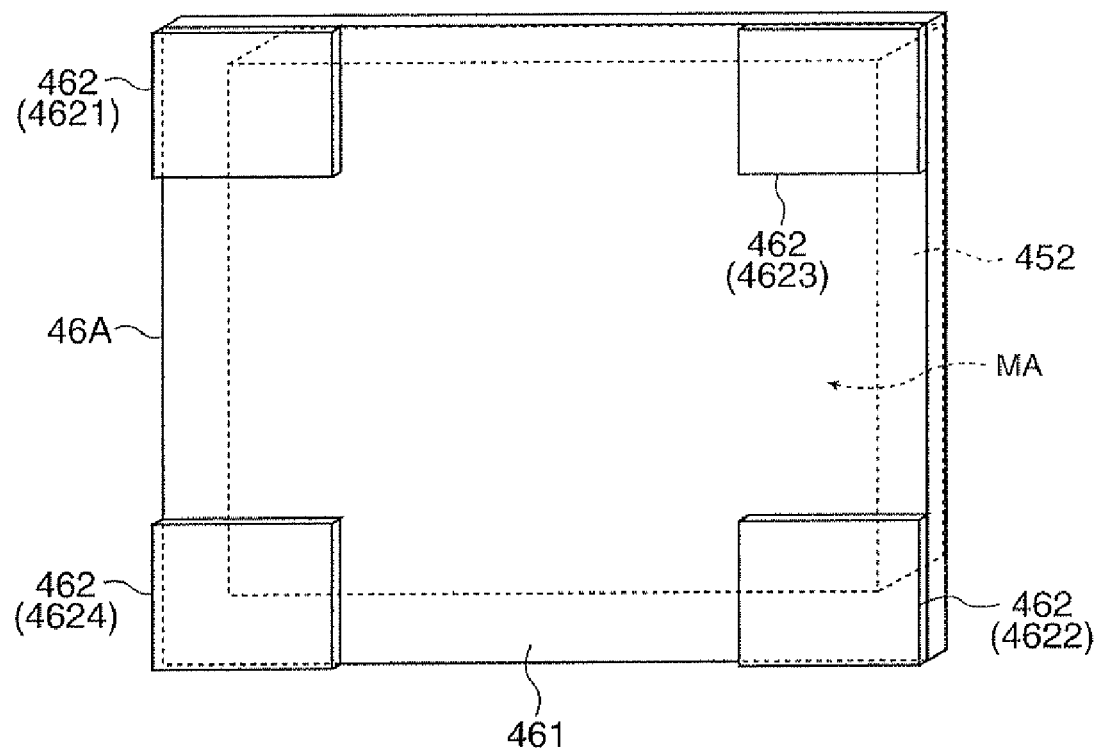
FIG. 4 is a schematic perspective view showing the configuration of another viewing angle compensator in the embodiment.

FIG. 4 is a schematic perspective view showing another viewing angle compensator 46A.

As shown in FIG. 4, the viewing angle compensator 46A includes four compensating elements 462 (4621 to 4624) in total positioned on the light-transmissive substrate 461 at the four corners of the modulation area MA.

The compensation directions at the two corners on one of the diagonal lines of the modulation area MA are substantially perpendicular to the compensation directions at the two corners on the other diagonal line.

As a result, in the viewing angle compensator 46A, the compensation directions of the two compensating elements 4621 and 4622 corresponding to the two corners on one of the diagonal lines of the modulation area MA coincide with each other, and the compensation directions of the two compensating elements 4623 and 4624 corresponding to the two corners on the other diagonal line coincide with each other. Further, the compensation directions of the two compensating elements 4621 and 4622 are substantially perpendicular to the compensation directions of the two compensating elements 4623 and 4624. As a result, the viewing angle characteristics at the four corners of the modulation area MA are improved all together by pivoting the light-transmissive substrate 461, as described above.

The projector 1 of the present embodiment described above provides the following advantageous effect:

The viewing angle characteristics of each of the liquid crystal panels 452 can be partially improved by providing the compensating elements 462, which is sized to be smaller than the modulation area MA, between the corresponding liquid crystal panel 452 and light exiting-side polarizer 453 based on the viewing angle characteristics of the modulation area MA. It is therefore possible to improve the viewing angle characteristics of the liquid crystal panel 452 more preferably than in the case where a compensation element that covers the entire modulation area MA is used. It is therefore also possible to suppress unevenness in in-plane contrast of each of the NW light modulators 45 in the dark state.

Moreover, the viewing angle characteristics at the corners of the modulation area MA, which greatly differ from those at the center thereof, can be improved by providing the compensating elements 462 at the corners of the modulation area MA, whereby the viewing angle characteristics of the liquid crystal panel 452 can be appropriately improved.

The compensation directions of the compensating elements 4621 and 4622 corresponding to the two corners on a diagonal line of the modulation area MA substantially coincide with each other. Making use of this configuration, one can adjust the compensation directions of the compensating elements 4621 and 4622 all together in accordance with the viewing angle characteristics of the corresponding locations only by adjusting the position of the light-transmissive substrate 461. The compensating elements 4621 and 4622 can therefore be readily positioned, and so are the compensation elements 4623 and 4624.

The compensating elements 462 are located on the light flux exiting side of the modulation area MA. As a result, the viewing angle characteristics of the modulation area MA can be reliably improved irrespective of whether or not the lens array 4521 disposed on the light flux incident side of the liquid crystal layer 4525 is present. It is therefore possible to improve the viewing angle characteristics of the liquid crystal panel 452 more preferably.

Variations of Embodiment

The invention is not limited to the embodiment described above but encompasses variations, improvements, and other forms thereof to the extent that they can achieve the advantage of the invention.

In the embodiment described above, the compensating elements 462 are disposed at corners of the modulation area MA. In the invention, however, they are not necessarily disposed at corners but may be disposed in any areas within the modulation area MA. For example, the compensating element 462 may be disposed at the center of the modulation area MA. Further, the number of compensating elements to be disposed may be set as appropriate, and the compensating elements may be sized as appropriate to the extent that the size is smaller than the modulation area MA.

In the embodiment described above, each of the viewing angle compensators 46 and 46A includes the light-transmissive substrate 461 onto which a plurality of compensating elements 462 are attached, and the positions of the compensating elements 462 are adjusted by pivoting the light-transmissive substrate 461. In the invention, however, they are not necessarily adjusted this way. That is, the positions of the compensating elements 462 may be separately adjusted.

In the embodiment described above, each of the viewing angle compensators 46 and 46A is disposed between the corresponding liquid crystal panel 452 and light exiting-side polarizer 453. In the invention, however, the viewing angle compensator is not necessarily disposed this way but may be disposed between the liquid crystal panel 452 and light incident-side polarizer 451. Alternatively, two viewing angle compensators may be disposed between the light incident-side polarizer 451 and liquid crystal panel 452 and between the liquid crystal panel 452 and the light exiting-side polarizer 453. Still alternatively, another viewing angle compensator including a compensating element that covers the modulation area MA may be separately disposed.

In the embodiment described above, each of the liquid crystal panels 452 includes the lens array 4521, in which a plurality of tiny lenslets 4521A are arranged in a matrix in correspondence with the pixels. In the invention, however, the liquid crystal panel 452 is not necessarily configured this way. That is, each of the liquid crystal panels 452 used in the projector 1 may not include the lens array 4521. The thus configured liquid crystal panel is inexpensive but tends to suffer from the unevenness in in-plane contrast described above (black unevenness, for example), as compared with a liquid crystal panel with such a lens array. In contrast, employing either of the viewing angle compensators 46 and 46A allows the unevenness in in-plane contrast to be preferably suppressed and the manufacturing cost of the projector to be lower than a case where an expensive liquid crystal panel with such a lens array is employed.

In the embodiment described above, the projector 1 includes the three light modulators 45 (45R, 45G, and 45B), each of which is formed of the liquid crystal panel 452 and the polarizers 451 and 453. In the invention, however, the projector 1 is not necessarily configured this way. That is, the invention is applicable to a projector using one, two, or four or more light modulators.

The above embodiment has been described with reference to the configuration in which the optical unit 4 has a substantially L-like shape when viewed from the above, but the optical unit 4 is not necessarily configured this way. For example, the optical unit 4 may alternatively have a substantially U-like shape when viewed from the above.

In the embodiment described above, the projector is presented by way of example of the image display apparatus. The invention is not necessarily applied to a projector but is also applicable to a liquid crystal display.

The invention can be preferably used with an image display apparatus, such as a projector and a display including a liquid crystal panel.

The entire disclosure of Japanese Patent Application No. 2009-075193, filed Mar. 25, 2009 is expressly incorporated by reference herein.

What is claimed is:

1. An image display apparatus comprising:
a light source;
a light modulator that modulates the light flux emitted from the light source, the light modulator including
a liquid crystal panel in which liquid crystal molecules are sealed, the liquid crystal panel having a modulation area where an incident light flux is modulated, and
a pair of polarizing elements disposed on opposite sides of the liquid crystal panel, on the light flux incident side and the light flux exiting side thereof; and
a compensating element disposed between at least one of the pair of polarizing elements and the modulation area, the compensating element compensating an optical phase difference resulting from birefringence associated with the liquid crystal molecules, the compensating element being sized to be smaller than the modulation area and disposed based on the viewing angle characteristics of the modulation area.

2. The image display apparatus according to claim 1,
wherein the modulation area has a substantially rectangular shape when viewed in the direction in which the light flux incident on the modulation area travels, and
the compensating element is disposed at least one of the four corners of the modulation area.

3. The image display apparatus according to claim 2,
wherein the compensating element is disposed at the two corners on at least one of the pair of diagonal lines of the modulation area, and
the image display apparatus further comprises a light-transmissive substrate that holds the compensating elements in such a way that the compensation directions thereof substantially coincide with each other.

4. The image display apparatus according to claim 1,
wherein the compensating element is disposed between the modulation area and the polarizing element located at the light flux exiting side of the modulation area.

5. A viewing angle compensation method for compensating an optical phase difference resulting from birefringence associated with liquid crystal molecules sealed in a liquid crystal panel having a modulation area where an incident light flux is modulated, the method comprising:
disposing a compensating element that is sized to be smaller than the modulation area and compensates the optical phase difference resulting from the birefringence associated with the liquid crystal molecules on at least one of the light flux incident side and the light flux exiting side of the modulation area based on the viewing angle characteristics of the modulation area; and
adjusting the compensation direction of the compensating element based on the viewing angle characteristics of the modulation area.

* * * * *